United States Patent
Ji et al.

(10) Patent No.: US 9,845,845 B2
(45) Date of Patent: Dec. 19, 2017

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gunpo-si (KR); Seong Wook Hwang, Gunpo-si (KR); Woo Jin Chang, Suwon-si (KR); Wonmin Cho, Hwaseong-si (KR); Hyun Sik Kwon, Seoul (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/265,751

(22) Filed: Sep. 14, 2016

(65) Prior Publication Data

US 2017/0268620 A1 Sep. 21, 2017

(30) Foreign Application Priority Data

Mar. 18, 2016 (KR) .......................... 10-2016-0032993

(51) Int. Cl.
*F16H 37/06* (2006.01)
*F16H 3/44* (2006.01)
*F16H 3/62* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ................. F16H 2200/2012; F16H 2200/2046
See application file for complete search history.

(56) References Cited

U.S. PATENT DOCUMENTS

| | | | | |
|---|---|---|---|---|
| 7,566,283 | B2 * | 7/2009 | Gumpoltsberger | F16H 3/66 |
| | | | | 475/275 |
| 8,025,602 | B2 | 9/2011 | Phillips et al. | |
| 9,534,670 | B1 * | 1/2017 | Ji | F16H 3/666 |
| 9,587,718 | B1 * | 3/2017 | Kim | F16H 3/666 |
| 9,625,010 | B2 * | 4/2017 | Kwon | F16H 3/66 |
| 9,664,259 | B1 * | 5/2017 | Kook | F16H 3/66 |
| 9,709,135 | B1 * | 7/2017 | Kook | F16H 3/66 |
| 2007/0225108 | A1 * | 9/2007 | Kamm | F16H 3/66 |
| | | | | 475/275 |
| 2016/0146297 | A1 * | 5/2016 | Cho | F16H 3/66 |
| | | | | 475/269 |
| 2016/0146299 | A1 * | 5/2016 | Cho | F16H 3/66 |
| | | | | 475/269 |

* cited by examiner

*Primary Examiner* — Tisha Lewis
(74) *Attorney, Agent, or Firm* — Morgan, Lewis & Bockius LLP

(57) ABSTRACT

A planetary gear train of an automatic transmission for vehicle may include an input shaft receiving power of an engine, an output shaft outputting shifted power of the engine, a first planetary gear set, a second planetary gear set, a third planetary gear set, a fourth planetary gear set, a first shaft directly connected with the input shaft, a second shaft, a third shaft, a fourth shaft selectively connectable to the third shaft, a fifth shaft selectively connectable with the third shaft, a sixth shaft, a seventh shaft directly connected with a transmission housing, an eighth shaft selectively connectable with each of the fifth shaft and the sixth shaft, and a ninth shaft selectively connectable with the fifth shaft, and directly connected with the output shaft.

8 Claims, 2 Drawing Sheets

FIG. 2

| Shift-stage | Control element | | | | | | Gear ratio |
|:---:|:---:|:---:|:---:|:---:|:---:|:---:|:---:|
| | C1 | C2 | C3 | C4 | C5 | B1 | |
| D1 | | | ● | ● | | ● | 4.009 |
| D2 | ● | | ● | | | ● | 2.359 |
| D3 | | ● | ● | | | ● | 1.513 |
| D4 | ● | ● | | | | ● | 1.185 |
| D5 | ● | ● | ● | | | | 1.000 |
| D6 | ● | ● | | | ● | | 0.816 |
| D7 | | ● | ● | | ● | | 0.670 |
| D8 | ● | | ● | | ● | | 0.545 |
| D9 | | | ● | ● | ● | | 0.479 |
| D10 | ● | | | ● | ● | | 0.408 |
| REV | | ● | | ● | ● | | 4.777 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2016-0032993, filed Mar. 18, 2016, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles, which can improve a power transmission capability and enhance fuel efficiency by implementing at least ten forward speeds by a minimum number of components and improve driving silence of a vehicle by using an operating point at a low rpm region of an engine.

Description of Related Art

In general, in the automatic transmission field, more shift-stages as a technology for improving fuel efficiency of a vehicle and maximizing drivability has been researched. Recent increases in oil prices are triggering stiff competition in enhancing fuel consumption of a vehicle. As a result, in the case of an engine, research for reducing a weight and enhancing the fuel efficiency through downsizing has been conducted and in the case of an automatic transmission, research which can secure both drivability and fuel efficiency competitiveness through more shift-stages has been conducted.

However, in the case of the automatic transmission, as the number of shift-stages increases, the number of internal components (particularly, planetary gear sets) increase, and as a result, a length of the transmission increases. This may deteriorate installability and/or power flow efficiency and may increase production cost, and weight. Accordingly, in the case of the automatic transmission, development of a planetary gear train which may bring about maximum efficiency with a small number of components is important in order to increase a fuel efficiency enhancement effect through the more shift-stages.

In this aspect, in recent years, the automatic transmission has been configured to implement a transmission of eight-speeds or more to be mounted on the vehicle and research and development of a planetary gear train capable of implementing a shift-stage of eight speeds or more have also been continuously required.

However, most general automatic transmissions of eight speeds or more generally include 3 to 4 planetary gear sets and 5 to 6 control elements (friction elements) and in this case, the whole length increases, and as a result, the mountability is likely to deteriorate.

As a result, in order to make the shift-stages (speed stages) of the automatic transmission into the multiple speed-stages, in recent years, a double row structure that arranges one planetary gear set on another planetary gear set has been adopted, or a dog clutch has been applied instead of a wetting control element, but in this case, an applicable structure is limited and deterioration of shift quality due to the application of the dog clutch is accompanied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles, which can improve a power transmission capability and enhance fuel efficiency depending on a multi-stage shift-stage by implementing a shift-stage of at least 10 forward speeds or more and a shift-stage of at least one reverse speed or more with a minimum number of components and improves driving silence of a vehicle by using an operating point in a low rpm region of an engine.

According to various aspects of the present invention, a planetary gear train of an automatic transmission for vehicles, comprising may include an input shaft receiving power of an engine, an output shaft outputting shifted power of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first shaft connecting the first rotation element, the fifth rotation element and eighth rotation element, and directly connected with the input shaft, a second shaft connecting the second rotation element and the twelfth rotation element, a third shaft connected with the third rotation element, a fourth shaft connected with the fourth rotation element and selectively connectable to the third shaft, a fifth shaft connected with the sixth rotation element and selectively connectable with the third shaft, a sixth shaft connected with the seventh rotation element, a seventh shaft connected with the ninth rotation element and directly connected with a transmission housing, an eighth shaft connected with the tenth rotation element, selectively connectable with each of the fifth shaft and the sixth shaft, and a ninth shaft connected with the eleventh rotation element, selectively connectable with the fifth shaft, and directly connected with the output shaft.

The eighth shaft may be selectively connectable with the transmission housing.

The first, second, and third rotation elements may be a first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, respectively, and the tenth, eleventh, and twelfth rotation elements may be a fourth sun gear, a fourth planet carrier, and a fourth ring gear.

The planetary gear train may further include a first clutch selectively connecting the fifth shaft and the ninth shaft, a second clutch selectively connecting the third shaft and the fourth shaft, a third clutch selectively connecting the third shaft and the fifth shaft, a fourth clutch selectively connecting the fifth shaft and the eighth shaft, a fifth clutch selectively connecting the sixth shaft and the eighth shaft, and a first brake selectively connecting the eighth shaft and the transmission housing.

According to various aspects of the present invention, a planetary gear train of an automatic transmission for vehicles may include an input shaft receiving power of an engine, an output shaft outputting shifted power of the engine, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected with the first rotation element, the output shaft may be directly connected with the eleventh rotation element, the first rotation element may be directly connected with the fifth rotation element and the eighth rotation element, the second rotation element may be directly connected with the twelfth rotation element, the fourth rotation element may be selectively connectable with the third rotation element, the sixth rotation element may be selectively connectable with the third rotation element, the tenth rotation element may be selectively connectable with the sixth rotation element and the seventh rotation element, and the eleventh rotation element may be selectively connectable with the sixth rotation element.

The tenth rotation element may be selectively connectable with the transmission housing.

The planetary gear train may further include a first clutch selectively connecting the sixth rotation element and the eleventh rotation element, a second clutch selectively connecting the third rotation element and the fourth rotation element, a third clutch selectively connecting the third rotation element and the sixth rotation element, a fourth clutch selectively connecting the sixth rotation element and the tenth rotation element, a fifth clutch selectively connecting the seventh rotation element and the tenth rotation element, and a first brake selectively connecting the tenth rotation element and the transmission housing.

According to various embodiments of the present invention, four planetary gear sets are combined with 6 control elements to implement shift-stages of at least 10 forward shift-stages and at least 1 reverse shift-stage.

According to various embodiments of the present invention, a shift-stage suitable for an rpm of an engine can be implemented by making the shift-stage of an automatic transmission into multiple stages and in particular, driving silence of a vehicle can be improved by using an operating point in a low rpm region of the engine.

Further, engine operating efficiency can be maximized through high-efficiency multiple stages and a power transmissions capability and fuel efficiency can be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operating table for each shift-stage of a control element applied to the planetary gear train according to various embodiments of the present invention.

Figure 1:
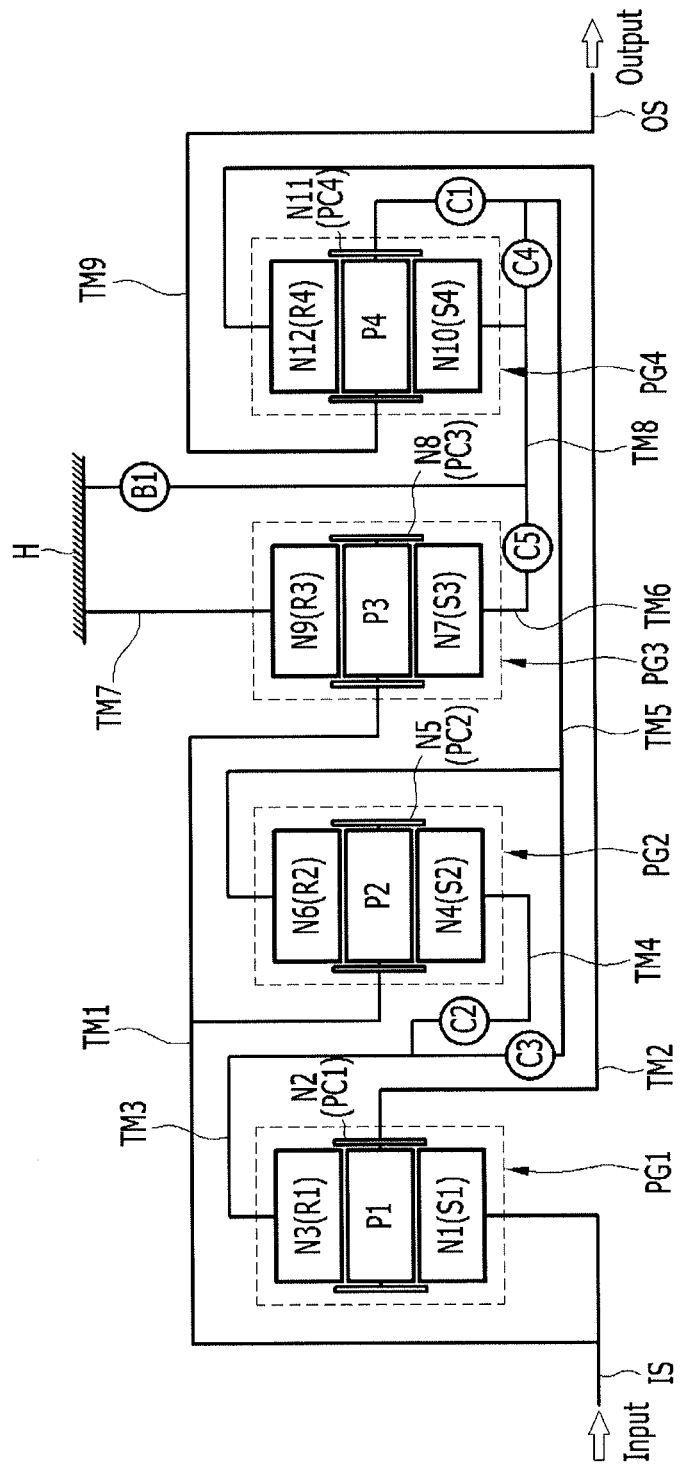
FIG. 1 is a configuration diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same axial line, an input shaft IS, an output shaft OS, 9 shafts TM1 to TM9 connecting respective rotation elements of the first, second, third, and fourth planetary gear sets PG1, PG2, PG3, and PG4, 5 clutches C1 to C5 and 1 brake B1 as control elements, and a transmission housing H.

In addition, rotation power from an engine input from the input shaft IS is shifted by a complementary actuation of the first, second, third, and fourth planetary gear sets PG1, PG2, PG3, and PG4 and output through the output shaft OS.

Herein, the respective planetary gear sets are disposed in the order of the first, second, third, and fourth planetary gear sets PG1, PG2, PG3, and PG4 from the engine side.

The input shaft IS is an input member and torque of the rotation power from a crankshaft of the engine is converted through a torque converter to be input into the input shaft IS.

The output shaft OS as an output member is disposed on the same axial line to transmit shifted drive force to a drive shaft through a differential device.

The first planetary gear set PG1 as a single pinion planetary gear set includes a first sun gear S1 as a first rotation element N1, a first planet carrier PC1 as a second rotation element N2 rotatably supporting a first pinion gear P1 which externally engages with the first sun gear S1 as the first rotation element N1, and a first ring gear R1 as a third rotation element N3 which internally engages with the first pinion gear P1.

The second planetary gear set PG2 as the single pinion planetary gear set includes a second sun gear S2 as a fourth rotation element N4, a second planet carrier PC2 as a fifth rotation element N5 rotatably supporting a second pinion gear P2 which externally engages with the second sun gear S2 as the fourth rotation element N4, and a second ring gear R2 as a sixth rotation element N6 which internally engages with the second pinion gear P2.

The third planetary gear set PG3 as the single pinion planetary gear set includes a third sun gear S3 as a seventh rotation element N7, a third planet carrier PC3 as an eighth rotation element N8 rotatably supporting a third pinion gear P3 which externally engages with the third sun gear S3 as the seventh rotation element N7, and a third ring gear R3 as a ninth rotation element N9 which internally engages with the third pinion gear P3.

The fourth planetary gear set PG4 as the single pinion planetary gear set includes a fourth sun gear S4 as a tenth rotation element N10, a fourth planet carrier PC4 as an eleventh rotation element N11 rotatably supporting a fourth pinion gear P4 which externally engages with the fourth sun gear S4 as the tenth rotation element N10, and a fourth ring gear R4 as a twelfth rotation element N12 which internally engages with the fourth pinion gear P4.

Herein, the first, second, third, and fourth planetary gear sets PG1, PG2, PG3, and PG4 operate while possessing a total of 9 shafts TM1 to TM9 while the first rotation element N1 is directly connected to the fifth rotation element N5 and the eighth rotation element N8, and the second rotation element N2 is directly connected to the twelfth rotation element N12.

The configuration of 9 shafts TM1 to TM9 will be described below in detail.

However, the 9 shafts TM1 to TM9 may be rotation members that transmit power while rotating together with the connected rotation elements in order to directly connect or selectively connect a plurality of rotation elements among the rotation elements of the planetary gear sets PG1, PG2, PG3, and PG4 and fixation members that directly connect and fix the rotation elements to the transmission housing H.

The first shaft TM1 connects the first rotation element (N1; first sun gear S1) and the fifth rotation element (N5; second planet carrier PC2) and the eighth rotation element (N8; third planet carrier PC3), and is connected with the input shaft IS to continuously serve as an input element.

The second shaft TM2 connects the second rotation element (N2; first planet carrier PC1) and the first rotation element (N12; fourth ring gear R4).

The third shaft TM3 is connected with the third rotation element (N3; first ring gear R1).

The fourth shaft TM4 is connected with the fourth rotation element (N4; second sun gear S2), and is selectively connectable with the third shaft TM3.

The fifth shaft TM5 is connected with the sixth rotation element (N6; second ring gear R2), and is selectively connectable with the third shaft TM3.

The sixth shaft TM6 is connected with the seventh rotation element (N7; third sun gear S3).

The seventh shaft TM7 is connected with the ninth rotation element (N9; third ring gear R3), and is directly connected with the transmission housing (H) to continuously serves as a fixation element.

The eighth shaft TM8 is connected with the tenth rotation element (N10; fourth sun gear S4), and selectively connectable with the fifth shaft TM5 and the sixth shaft TM6 and transmission housing (H).

The ninth shaft TM9 is connected with the eleventh rotation element (N11; fourth planet carrier PC4), is selectively connectable with the fifth shaft TM5, and is directly connected with the output shaft OS to continuously serve as the output element.

In addition, among the 9 shafts TM1 to TM9, 5 clutches C1, C2, C3, C4 and C5 are disposed in a part where the shafts are selectively connectable, which includes the input shaft IS and the output shaft OS.

Further, among the 9 shafts TM1 to TM9, 1 brake B1 are disposed in a part which is selectively connectable with the shaft and the transmission housing H.

That is, layout positions of the 5 clutches C1 to C5 and the 1 brake B1 will be described below.

The first clutch C1 is disposed between the fifth shaft TM5 and the ninth shaft TM9 to selectively connect the fifth shaft TM5 and the ninth shaft TM9 to transmit power.

The second clutch C2 is disposed between the third shaft TM3 and the fourth shaft TM4 to selectively connect the third shaft TM3 and the fourth shaft TM4 to transmit the power.

The third clutch C3 is disposed between the third shaft TM3 and the fifth shaft TM5 to selectively connect the third shaft TM3 and the fifth shaft TM5 to transmit the power.

The fourth clutch C4 is disposed between the fifth shaft TM5 and the eighth shaft TM8 to selectively connect the fifth shaft TM5 and the eighth shaft TM8 to transmit the power.

The fifth clutch C5 is disposed between the sixth shaft TM6 and the eighth shaft TM8 to selectively connect the sixth shaft TM6 and the eighth shaft TM8 to transmit the power.

The first brake B1 is disposed between the eighth shaft TM8 and the transmission housing (H) and selectively connects and fixes the eighth shaft TM8 to the transmission housing (H).

Respective control elements constituted by the first, second, third, fourth, and fifth clutches C1, C2, C3, C4 and C5 and the first brake B1 may be configured by a multi-plate type hydraulic friction coupling unit which is frictionally coupled with each other by oil pressure.

FIG. 2 is an operating table for each shift-stage of a control element applied to the planetary gear train according to various embodiments of the present invention.

Referring to FIG. 2, in the planetary gear train according to various embodiments of the present invention, while among the first, second, third, fourth and fifth clutches C1, C2, C3, C4 and C5 and the first brake B1 which are the control elements, three control elements are actuated, shifting of one reverse speed and up to forward ten speed is performed in each shift-stage and a shifting process is described below.

In a forward first shift-stage D1, the third and fourth clutches C3 and C4 and the first brake B1 are simultaneously actuated.

As a result, while the third shaft TM3 is connected with the fifth shaft TM5 by the operation of the third clutch C3 and the fifth shaft TM5 is connected with the eighth shaft TM8 by the operation of the fourth clutch C4, the rotation power of the input shaft IS is input into the first shaft TM1.

In addition, while the seventh shaft TM7 is continuously operated as the fixation element and the eighth shaft TM8 is operated as the fixation element by the operation of the first brake B1, the shift-stage is shifted to the forward 1 speed by the complementary actuation of the respective shafts, and as a result, the rotation power is output through the output shaft OS connected with the seventh shaft TM9.

In a forward second speed D2, the first and third clutch C1 and C3 and the first brake B1 are simultaneously operated.

As a result, while the fifth shaft TM5 is connected with the ninth shaft TM9 by the operation of the first clutch C1 and the third shaft TM3 is connected with the fifth shaft TM5 by the operation of the third clutch C3, the rotation power of the input shaft IS is input into the first shaft TM1.

In addition, while the seventh shaft TM7 is continuously operated as the fixation element and the eighth shaft TM8 is operated as the fixation element by the operation of the first brake B1, the shift—stage is sifted to the forward second speed by the complementary actuation of the respective shafts, and as a result, the rotation power is output through the output shaft OS connected with the ninth shaft TM9.

In a forward third speed D3, the second and third clutch C2 and C3 and the first brake B1 are simultaneously operated.

As a result, while the third shaft TM3 is connected with the fourth shaft TM4 by the operation of the second clutch C2 and the third shaft TM3 is connected with the fifth shaft TM5 by the operation of the third clutch C3, the rotation power of the input shaft IS is input into the first shaft TM1.

In addition, while the seventh shaft TM7 is continuously operated as the fixation element and the eighth shaft TM8 is operated as the fixation element by the operation of the first brake B1—the shift-stage is shifted to the forward third speed by the complementary operation of the respective shafts, and as a result, e rotation power is output through the output shaft OS connected with the ninth shaft TM9.

In a forward fourth speed D4, the first and second clutch C1 and C2 and the first brake B1 are simultaneously operated.

As a result, while the fifth shaft TM5 is connected with the ninth shaft TM9 by the operation of the first clutch C1 and the third shaft TM3 is connected with the fourth shaft TM4 by the operation of the second clutch C2, the rotation power of the input shaft IS is input into the first shaft TM1.

In addition, while the seventh shaft TM7 is continuously operated as the fixation element and the eighth shaft TM8 is operated as the fixation element by the operation of the first brake B1, the shift-stage is shifted to the forward fourth speed by the complementary operation of the respective shafts, and as a result, the rotation power is output through the output shaft OS connected with the ninth shaft TM9.

In a forward fifth speed D5, the first, second and third clutch C1, C2, and C3 are simultaneously operated.

As a result, while the fifth shaft TM5 is connected with the ninth shaft TM9 by the operation of the first clutch C1, the third shaft TM3 is connected with the fourth shaft TM4 by the operation of the second clutch C2, and the third shaft TM3 is connected with the fifth shaft TM5 by the operation of the third clutch C3, the rotation power of the input shaft IS is input into the first shaft TM1.

In addition, while the seventh shaft TM7 is continuously operated as the fixation element, the shift-stage is shifted to the forward fifth speed by the complementary operation of the respective shafts, and as a result, the rotation power is output through the output shaft OS connected with the ninth shaft TM9.

In a forward sixth speed D6, the first, second and fifth clutch C1, C2, and C5 are simultaneously operated.

As a result, while the fifth shaft TM5 is connected with the ninth shaft TM9 by the operation of the first clutch C1, the third shaft TM3 is connected with the fourth shaft TM4 by the operation of the second clutch C2, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the forward sixth speed by the complementary operation of the respective shafts, and as a result, the rotation power is output through the output shaft OS connected with ninth shaft TM9.

In a forward seventh speed D7, the second, third and fifth clutch C2, C3, and C5 are simultaneously operated.

As a result, while the third shaft TM3 is connected with the fourth shaft TM4 by the operation of the second clutch C2, the third shaft TM3 is connected with the fifth shaft TM5 by the operation of the third clutch C3, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the forward seventh speed by the complementary operation of the respective shafts, and as a result, the rotation power is output through the output shaft OS connected with ninth shaft TM9.

In a forward eighth speed D8, the first, third and fifth clutch C1, C3, and C5 are simultaneously operated.

As a result, while the fifth shaft TM5 is connected with the by the operation of the first clutch C1, the third shaft TM3 is connected with the fifth shaft TM5 by the operation of the third clutch C3, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the forward eighth speed by the complementary operation of the respective shafts, and as a result, the rotation power is output through the output shaft OS connected with ninth shaft TM9.

In a forward ninth speed D9, the third, fourth and fifth clutch C3, C4, and C5 are simultaneously operated.

As a result, while the third shaft TM3 is connected with the fifth shaft TM5 by the operation of the third clutch C3, the fifth shaft TM5 is connected with the eighth shaft TM8 by the operation of the fourth clutch C4, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the forward ninth speed by the complementary operation of the respective shafts, and as a result, the rotation power is output through the output shaft OS connected with ninth shaft TM9.

In a forward tenth speed D10, the first, fourth and fifth clutch C1, C4, and C5 are simultaneously operated.

As a result, while the fifth shaft TM5 is connected with the ninth shaft TM9 by the operation of the first clutch C1, the fifth shaft TM5 is connected with the eighth shaft TM8 by the operation of the fourth clutch C4, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the forward tenth speed by the complementary operation of the respective shafts, and as a result, the rotation power is output through the output shaft OS connected with the ninth shaft TM9.

In a reverse speed REV, the second, fourth and fifth clutch C2, C4, and C5 are simultaneously operated.

As a result, while the third shaft TM3 is connected with the fourth shaft TM4 by the operation of the second clutch C2, the fifth shaft TM5 is connected with the eighth shaft TM8 by the operation of the fourth clutch C4, and the sixth shaft TM6 is connected with the eighth shaft TM8 by the operation of the fifth clutch C5, the rotation power of the input shaft IS is input into the first shaft TM1.

In addition, while the seventh shaft TM7 is continuously operated as the fixation element, the shift-stage is shifted to the reverse speed by the complementary operation of the respective shafts, and as a result, the rotation power is reversely output through the output shaft OS connected with the ninth shaft TM9.

In the planetary gear train according to various embodiments of the present invention, shift-stags of at least ten forward speeds and at least one reverse speed or more may be realized through controlling actuation of 4 clutches C1, C2, C3, and C4 and 2 brakes B1 and B2 in 4 planetary gear sets PG1, PG2, PG3, and PG4.

Further, in the planetary gear train according to various embodiments of the present invention, a shift-stage suitable for an rpm of an engine may be implemented by making the shift-stage of an automatic transmission into multiple stages and in particular, driving silence of a vehicle can be improved by using an operating point in a low rpm region of the engine.

In addition, according to various embodiments of the present invention, in the planetary gear train, engine operating efficiency can be maximized through high-efficiency multiple stages of the automatic transmission and a power transmissions capability and fuel efficiency can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicle, comprising:
    an input shaft receiving power of an engine;
    an output shaft outputting shifted power of the engine;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft connecting the first rotation element, the fifth rotation element and eighth rotation element, and directly connected with the input shaft;
    a second shaft connecting the second rotation element and the twelfth rotation element;
    a third shaft connected with the third rotation element;
    a fourth shaft connected with the fourth rotation element and selectively connectable to the third shaft;
    a fifth shaft connected with the sixth rotation element and selectively connectable with the third shaft;
    a sixth shaft connected with the seventh rotation element;
    a seventh shaft connected with the ninth rotation element and directly connected with a transmission housing;
    an eighth shaft connected with the tenth rotation element, selectively connectable with each of the fifth shaft and the sixth shaft; and
    a ninth shaft connected with the eleventh rotation element, selectively connectable with the fifth shaft, and directly connected with the output shaft.

2. The planetary gear train of claim 1, wherein the eighth shaft is selectively connectable with the transmission housing.

3. The planetary gear train of claim 1, wherein
    the first rotation element, the second rotation element, and the third rotation element comprise a first sun gear, a first planet carrier, and a first ring gear;
    the fourth rotation element, the fifth rotation element, and the sixth rotation element comprise a second sun gear, a second planet carrier, and a second ring gear;
    the seventh rotation element, the eighth rotation element, and the ninth rotation element comprise a third sun gear, a third planet carrier, and a third ring gear, respectively; and
    the tenth rotation element, the eleventh rotation element, and the twelfth rotation element comprise a fourth sun gear, a fourth planet carrier, and a fourth ring gear.

4. The planetary gear train of claim 2, further comprising:
    a first clutch selectively connecting the fifth shaft and the ninth shaft;
    a second clutch selectively connecting the third shaft and the fourth shaft;
    a third clutch selectively connecting the third shaft and the fifth shaft;
    a fourth clutch selectively connecting the fifth shaft and the eighth shaft;
    a fifth clutch selectively connecting the sixth shaft and the eighth shaft; and
    a first brake selectively connecting the eighth shaft and the transmission housing.

5. A planetary gear train of an automatic transmission for vehicle, comprising:
    an input shaft receiving power of an engine;
    an output shaft outputting shifted power of the engine;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element; and
    a fourth planetary gear set including a tenth rotation element, an eleventh rotation element, and a twelfth rotation element,
    wherein the input shaft is directly connected with the first rotation element,
    the output shaft is directly connected with the eleventh rotation element,
    the first rotation element is directly connected with the fifth rotation element and the eighth rotation element,
    the second rotation element is directly connected with the twelfth rotation element,
    the fourth rotation element is selectively connectable with the third rotation element,
    the sixth rotation element is selectively connectable with the third rotation element, the tenth rotation element is selectively connectable with the sixth rotation element and the seventh rotation element, and the eleventh rotation element is selectively connectable with the sixth rotation element.

6. The planetary gear train of claim 5, wherein the tenth rotation element is selectively connectable with the transmission housing.

7. The planetary gear train of claim 5, wherein the first rotation element, the second rotation element, and the third rotation element comprise a first sun gear, a first planet carrier, and a first ring gear;

the fourth rotation element, the fifth rotation element, and the sixth rotation element comprise a second sun gear, a second planet carrier, and a second ring gear;

the seventh rotation element, the eighth rotation element, and the ninth rotation element comprise a third sun gear, a third planet carrier, and a third ring gear, respectively; and the tenth rotation element, the eleventh rotation element, and the twelfth rotation element comprise a fourth sun gear, a fourth planet carrier, and a fourth ring gear.

8. The planetary gear train of claim 6, further comprising:

a first clutch selectively connecting the sixth rotation element and the eleventh rotation element;

a second clutch selectively connecting the third rotation element and the fourth rotation element;

a third clutch selectively connecting the third rotation element and the sixth rotation element;

a fourth clutch selectively connecting the sixth rotation element and the tenth rotation element;

a fifth clutch selectively connecting the seventh rotation element and the tenth rotation element; and a first brake selectively connecting the tenth rotation element and the transmission housing.

* * * * *